US012632285B2

(12) United States Patent
Bhargav-Spantzel et al.

(10) Patent No.: US 12,632,285 B2
(45) Date of Patent: May 19, 2026

(54) WIRELESS NETWORK AUTHENTICATION BY A TRUSTED VIRTUAL MACHINE

(71) Applicant: Intel Corporation, Santa Clara, CA (US)

(72) Inventors: Abhilasha Bhargav-Spantzel, Santa Clara, CA (US); Michael Glik, Kfar Saba (IL); Matan Levy, Zur Moshe (IL); Ned M. Smith, Beaverton, OR (US); Izoslav Tchigevsky, Haifa (IL)

(73) Assignee: Intel Corporation, Santa Clara, CA (US)

( * ) Notice: Subject to any disclaimer, the term of this patent is extended or adjusted under 35 U.S.C. 154(b) by 794 days.

(21) Appl. No.: 17/484,473

(22) Filed: Sep. 24, 2021

(65) Prior Publication Data

US 2022/0014917 A1     Jan. 13, 2022

(51) Int. Cl.
*G06F 9/455*          (2018.01)
*G06F 9/46*           (2006.01)

(52) U.S. Cl.
CPC .......... *G06F 9/468* (2013.01); *G06F 9/45558* (2013.01); *G06F 2009/45587* (2013.01); *G06F 2009/45595* (2013.01)

(58) Field of Classification Search
CPC ................ G06F 9/468; G06F 9/45558; G06F 2009/45587; G06F 2009/45595
USPC ........................................................... 718/1
See application file for complete search history.

(56) References Cited

U.S. PATENT DOCUMENTS

| | | | | |
|---|---|---|---|---|
| 2007/0189308 A1* | 8/2007 | Tchigevsky | ......... | H04L 12/4625 370/396 |
| 2007/0234412 A1* | 10/2007 | Smith | ..................... | G06F 21/53 726/11 |
| 2007/0294760 A1* | 12/2007 | Sood | ................... | H04L 63/0869 726/15 |
| 2008/0244688 A1* | 10/2008 | McClain | ............... | G06F 21/604 726/1 |
| 2013/0061293 A1* | 3/2013 | Mao | ........................ | G06F 21/53 726/4 |
| 2014/0101726 A1* | 4/2014 | Gupta | ................... | H04L 5/0055 370/235 |
| 2014/0331297 A1* | 11/2014 | Innes | .................. | H04L 63/0823 726/7 |
| 2014/0380310 A1* | 12/2014 | Wei | ........................ | G06F 21/34 718/1 |
| 2017/0063815 A1* | 3/2017 | Smith | ..................... | H04L 63/10 |
| 2017/0272404 A1* | 9/2017 | Prey | ................... | H04L 63/0272 |
| 2017/0289138 A1* | 10/2017 | Ben-Shalom | ....... | H04L 63/0823 |
| 2019/0014117 A1* | 1/2019 | Li | ......................... | H04W 12/06 |
| 2019/0229897 A1* | 7/2019 | Verrall | .................. | H04L 9/0894 |
| 2019/0253431 A1* | 8/2019 | Atanda | .................. | G06F 21/62 |
| 2019/0349426 A1* | 11/2019 | Smith | ................. | H04L 63/123 |

(Continued)

*Primary Examiner* — Dong U Kim
(74) *Attorney, Agent, or Firm* — KDW FIRM PLLC

(57)          ABSTRACT

Systems and methods for a virtual machine executing on a host device to establish a secured wireless connection and control a wireless network device without being exposed to the wireless network credentials are provided. A supplicant proxy is provided at the virtual machine to route authentication requests generated at the virtual machine through a supplicant and receive session keys from the supplicant, where the supplicant is at another virtual machine executing on the host device and has access to the network credentials.

15 Claims, 8 Drawing Sheets

(56)            References Cited

U.S. PATENT DOCUMENTS

2020/0367054 A1 * 11/2020 Obaidi ................. H04L 9/0643
2023/0308871 A1 * 9/2023 Castellanos Zamora ...................
                                         H04W 12/084

* cited by examiner

400

GENERATE, AT A WIRELESS NETWORK STACK OF A FIRST VIRTUAL MACHINE (VM) EXECUTING ON A HOST DEVICE, AN INDICATION TO AUTHENTICATE A WIRELESS DATA LINK ESTABLISHED BETWEEN THE WIRELESS NETWORK STACK AND A WIRELESS ACCESS POINT VIA A WIRELESS NETWORK DEVICE OF THE HOST DEVICE 402

SEND THE INDICATION TO AUTHENTICATE THE WIRELESS DATA LINK TO A SUPPLICANT OF A SECOND VM EXECUTING ON THE HOST DEVICE 404

RECEIVE FROM THE SUPPLICANT ONE OR MORE SESSION KEYS 406

SECURE THE WIRELESS DATA LINK BASED ON THE ONE OR MORE SESSION KEYS 408

FIG. 4

500

RECEIVE, AT A SUPPLICANT OF A FIRST VIRTUAL MACHINE (VM) EXECUTING ON A HOST DEVICE, AN INDICATION TO AUTHENTICATE A WIRELESS DATA LINK ESTABLISHED BETWEEN A WIRELESS NETWORK STACK OF A SECOND VM AND A WIRELESS ACCESS POINT VIA A WIRELESS NETWORK DEVICE OF THE HOST DEVICE, THE SECOND VM EXECUTING ON THE HOST DEVICE 502

ESTABLISH WIRELESS AUTHENTICATION OF THE WIRELESS DATA LINK WITH AN AUTHENTICATION SERVER BASED ON THE INDICATION TO AUTHENTICATE 504

RECEIVE, AT THE SUPPLICANT, ONE OR MORE SESSION KEYS ASSOCIATED WITH THE WIRELESS AUTHENTICATION 506

INSTALL THE ONE OR MORE SESSION KEYS IN THE WIRELESS NETWORK STACK 508

COMPUTER EXECUTABLE INSTRUCTIONS 602

METHOD 200

METHOD 300

METHOD 400

METHOD 500

WIRELESS NETWORK AUTHENTICATION BY A TRUSTED VIRTUAL MACHINE

BACKGROUND

Virtual machines are often used in modern computing systems to segregate computing tasks and/or data and to increase efficiency of resource utilization. Existing virtualization allow a virtual machine (VM) executing on a host device to control a wireless network device of the host device and establish a wireless connection. This VM will enjoy the full set of wireless device services, such as, Wi-Fi based location, peer-to-peer services (e.g., WiDi, Miracast, WiFi sensing etc.), as well as maximal performance. Other VMs executing on the same host device cannot access all Wi-Fi services and are instead limited to virtual ethernet capabilities, which often results in degraded performance relative to the main VM controlling the wireless network device.

Providing another VM executing on the host device with full wireless network device capabilities and services requires that the VM gain ownership of the wireless network device itself and receive the wireless network credentials from the original VM controlling the wireless network device. This creates several security risks.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 illustrates yet another method of authenticating a wireless network connection, in accordance with at least one embodiment of the present disclosure.

FIG. 5 illustrates still another method of authenticating a wireless network connection, in accordance with at least one embodiment of the present disclosure.

DETAILED DESCRIPTION

The present disclosure is generally directed to allowing a VM to connect to a wireless network device and control the wireless network device without being exposed to the network credentials. In particular, the present disclosure provides that a VM executing on a host device desiring to control a wireless network device is provisioned with a supplicant proxy arranged to communicatively connect with a supplicant residing in another VM executing on the host device where the other VM has access to the network credentials for the wireless network device. As such, the network credentials need not be shared with the VM desiring to control the wireless network device yet nevertheless, the VM can control the wireless network device.

It is to be appreciated that for a VM executing on a host device to access the full range of wireless capabilities and the highest levels of performance (e.g., low latency, or the like) that the VM must gain control of the wireless network device of the host device (e.g., virtualization technology (VT) for directed I/O (VT-d), VM control shifting, or the like). However, such solutions require exposure of the network credentials to the VM, which introduces multiple security risks. Accordingly, if multiple VMs are to control the wireless network device (although not at the same time) each VM must have access to the network credentials.

A virtual switch can be utilized to provide wireless services without exposing the network credentials. However, routing the traffic between VMs on a host device via a virtual switch introduces latency. Additionally, the virtual switch looks like an ethernet port to the VMs, and as such, they can use it to send and/or receive IP traffic but they cannot use it to access many wireless device supported features (e.g., peer-to-peer, WiDi, Miracast, Wi-Fi sensing, Wi-Fi based location, etc.).

Accordingly, the present disclosure provides that "untrusted" VMs (or rather VMs without access to the wireless network credentials) can nevertheless control wireless devices. This provides that wireless network credentials can be stored in a "trusted" VM for safe storage and/or centralized consistent maintenance while also enabling wireless connectivity by any other untrusted VM executing on the same host device. The untrusted VMs are able to establish wireless connectivity without having direct access to the network credentials stored in the trusted VM. Thus, providing multiple VMs without ability to access wireless network device specific services and also leverage better performance (e.g., lower latency, or the like) while maintaining a single copy of the network credentials (e.g., in the trusted VM).

Additionally, control of wireless network devices with operating systems and/or interfaces that are more applicable to a particular task yet less secure can be used without exposing the network credentials to the less secure environment.

Figure 1:
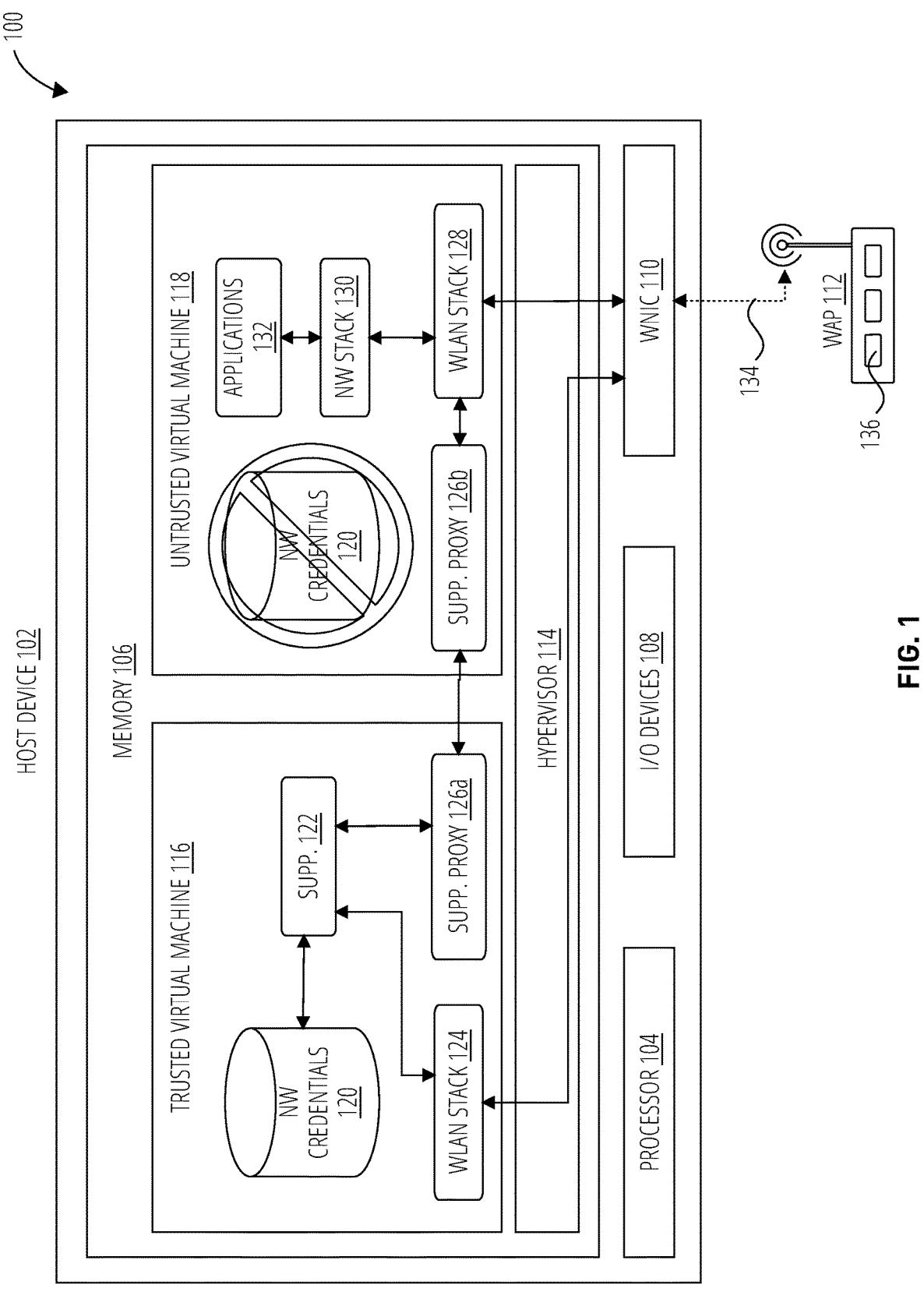
FIG. 1 illustrates a system in accordance with at least one embodiment of the present disclosure.

FIG. 1 illustrates a system 100, in accordance with non-limiting example(s) of the present disclosure. System 100 includes a host device 102 including a processor 104, memory 106, input and/or output devices 108, and wireless network device 110. The processor 104 and the memory 106 may comprise logic, circuitry, interfaces and/or processor executable instructions (or "code") that may enable processing of data and/or controlling of operations for host device 102. The processor 104 may comprise, for example, an ×86 based CPU, an ARM, or an application specific integrated circuit (ASIC). The memory 106 may comprise, for example, SRAM and/or DRAM that stores data and/or instructions. The memory 106 may be implemented in a memory device (e.g., a hard drive, a solid-state device, or the like).

System 100 further includes wireless network access point 112 with which wireless network device 110 can communicatively couple to form a wireless network connection. Host device 102 may include a host partition (not shown) as well as multiple VMs executing on the host device 102. In particular, processor 104, utilizing the memory 106, may be operable to execute a number of operating systems (e.g., host operating system (OS) not shown, trusted virtual machine 116, untrusted virtual machine 118, etc.) and may further be operable to execute a hypervisor 114, which is arranged to manage the operation of the host OS and VMs.

In general, the present disclosure provides to facilitate access and control of wireless network device 110 by both trusted virtual machine 116 and untrusted virtual machine 118, regardless of the fact that 118 does not have access to NW credentials 120. As depicted, trusted virtual machine 116 includes NW credentials 120, a supplicant 122, and wireless local area network (WLAN) stack 124. Supplicant 122 can be arranged to establish a secure wireless connection using between wireless network device 110 and wireless network access point 112 using WLAN stack 124. Additionally, trusted virtual machine 116 includes supplicant proxy 126*a* arranged to communicate with supplicant 122 and another supplicant proxy (e.g., supplicant proxy 126*b*) in an untrusted VM (e.g., untrusted virtual machine 118).

Untrusted virtual machine 118 includes supplicant proxy 126*b*, WLAN stack 128, NW stack 130, and applications 132. Of note, untrusted virtual machine 118 does not include NW credentials 120. During operation, untrusted virtual machine 118 can establish a connection with wireless network access point 112 via wireless network device 110 and can control wireless network device 110 to access wireless services supported by wireless network device 110 without routing traffic through trusted virtual machine 116. This is explained in greater detail below. However, in general processor 104 executes supplicant proxy 126*b* and supplicant proxy 126*a* to route authentication protocol messages from WLAN stack 128 to supplicant 122 and further to authentication server 136 via wireless network access point 112. As such, a connection established by untrusted virtual machine 118 can be authenticated without exposing the NW credentials 120 to untrusted virtual machine 118 and further without sending the network credentials over the air interface 134.

Once established, processor 104 can execute applications 132 that access and connect to a wireless network via wireless network device 110 and wireless network access point 112 directly (e.g., without routing the traffic connections through trusted virtual machine 116. As such, the connection will not incur latency penalties suffered by conventional solutions.

It is noted that host device 102 could support more than two (2) VMs. For example, multiple untrusted VMs (e.g., multiple of untrusted virtual machine 118, or the like) could be supported each with the ability to connect to and control wireless network device 110 without being exposed to NW credentials 120. Additionally, multiple wireless networks could be accessible by host device 102 and/or multiple different wireless access points could be accessible. In some examples, a single trusted VM (e.g., trusted virtual machine 116) could be provided and arranged to store NW credentials 120 for each of the multiple wireless networks and/or wireless network access points. In other examples, multiple trusted virtual machines (e.g., multiple of trusted virtual machine 116, or the like) could be provided where each trusted VM stores NW credentials 120 for one of the wireless networks and/or wireless network access points.

Wireless network device 110 may comprise logic, circuitry, interfaces, and/or code that may be operable to transmit and receive data in adherence with one or more networking standards. For example, wireless network device 110 may implement physical layer functions, data link layer functions, network interface layer functions, Internet layer functions, and, in some instances, transport layer functions and application layer functions. The wireless network device 110 may, for example, communicate in adherence with one or more Ethernet standards defined in the Institute of Electrical and Electronics Engineers (IEEE) 802. The wireless network device 110 may be enabled to utilize virtualization such that it may present itself to the hypervisor 114 and/or to an external device (e.g., wireless network access point 112) as multiple devices.

The input and/or output devices 108 may comprise logic, circuitry, interfaces, and/or code that may be operable to, for example, communicate information between various components of the host device 102. The input and/or output devices 108 may comprise one or more standardized busses and one or more bus controllers. Accordingly, the input and/or output devices 108 may be operable to identify devices on the bus, enumerate devices on the bus, allocate and de-allocate resources for various devices on the bus, and/or otherwise manage communications on the bus. For example, the input and/or output devices 108 may be a PCIe system and may comprise a PCIe root complex and one or more PCIe switches and/or bridges. In some instances, the input and/or output devices 108 may be controlled by the hypervisor 114.

Figure 2:
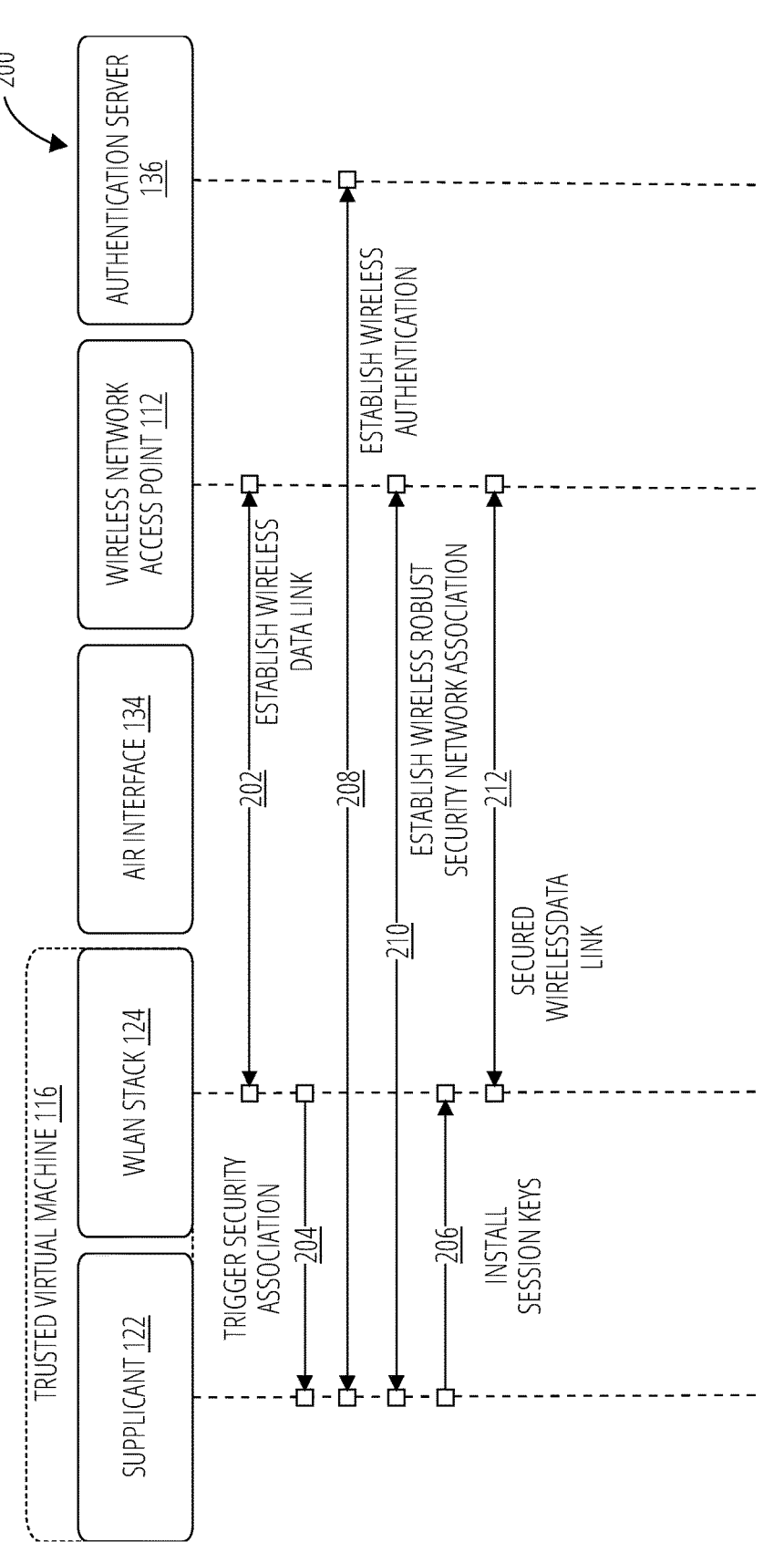
FIG. 2 illustrates a method of authenticating a wireless network connection, in accordance with at least one embodiment of the present disclosure.

FIG. 2 illustrates a method 200, in accordance with non-limiting example(s) of the present disclosure. In general, method 200 depicts operations of trusted virtual machine 116, wireless network access point 112, and authentication server 136 for trusted virtual machine 116 to establish a wireless connection with wireless network access point 112 via wireless network device 110 and to control wireless network device 110. Method 200 can begin at operation 202 "establish a wireless network data link" where a wireless network data link can be established. For example, processor 104 can execute WLAN stack 124 to establish a wireless network data link between wireless network device 110 and wireless network access point 112 over air interface 134. In some examples, processor 104 can execute WLAN stack 124 to establish the wireless network data link via one or more wireless network protocols or standards, such as, for example, IEEE 802.11.

Continuing to operation 204 "trigger security association" a security association for the wireless data link can be triggered. For example, processor 104 can execute WLAN stack 124 and supplicant 122 to establish security associations for the wireless data link established at operation 202. Continuing to operation 208 "establish wireless authentication" and to operation 210 "establish robust wireless security network association" processor 104 can execute supplicant 122 to authenticate trusted virtual machine 116 to wireless network access point 112 to secure the wireless data link established at operation 202. For example, processor 104 can execute supplicant 122 to cause WLAN stack 124 to generate extensible authentication protocol (EAP) frames and cause supplicant 122 to send the EAP frames and/or receive EAP frames to/from the authentication server 136 to authenticate trusted virtual machine 116 to authentication server 136 and ultimately receive session keys from the authentication server 136. It is noted that a number of standards have been developed to govern the authentication of peer devices and to control access to wireless networks. For example, IEEE 802.11i defines certain security protocols for wireless network access and authentication while and IEEE 802.1X provides a port-based authentication framework for 802 LANs, and, in particular, wireless local area networks (WLANs) that conform to the IEEE 802.11 standard. IEEE 802.1X can be implemented using a standard authentication protocol framework, such as EAP defined in RFC 3748.

In some examples, at operation 208 and operation 210, processor 104 can execute supplicant 122 to provide authentication methods such as, EAP transport layer security (EAP-TLS), EAP subscriber identity module (EAP-SIM), EAP authentication and key agreement (EAP-AKA), protected EAP (PEAP), lightweight EAP (LEAP), etc. However, examples are not limited in this context.

As part of operation 210, processor 104 executes supplicant 122 to cause supplicant 122 to receive session keys (e.g., master session keys (MSKs) via an EAP specific key exchange protocol. The MSKs can be used to generate transient session keys (TSKs). The MSKs and TSKs can have key lifetimes negotiated by trusted virtual machine 116 and authentication server 136. Once supplicant 122 receives the session keys, method 200 can continue to operation 206. At operation 206 "install session keys" the session keys received at operation 210 or session keys derived from the session keys received at operation 210 can be installed in WLAN stack 124. For example, processor 104 can execute supplicant 122 to cause supplicant 122 to install the session keys in WLAN stack 124.

Continuing to operation 212 "secured data link" processor 104 can execute WLAN stack 124 to secure the data link established between wireless network device 110 and wireless network access point 112 at operation 202, for example, with the installed session keys.

Figure 3:
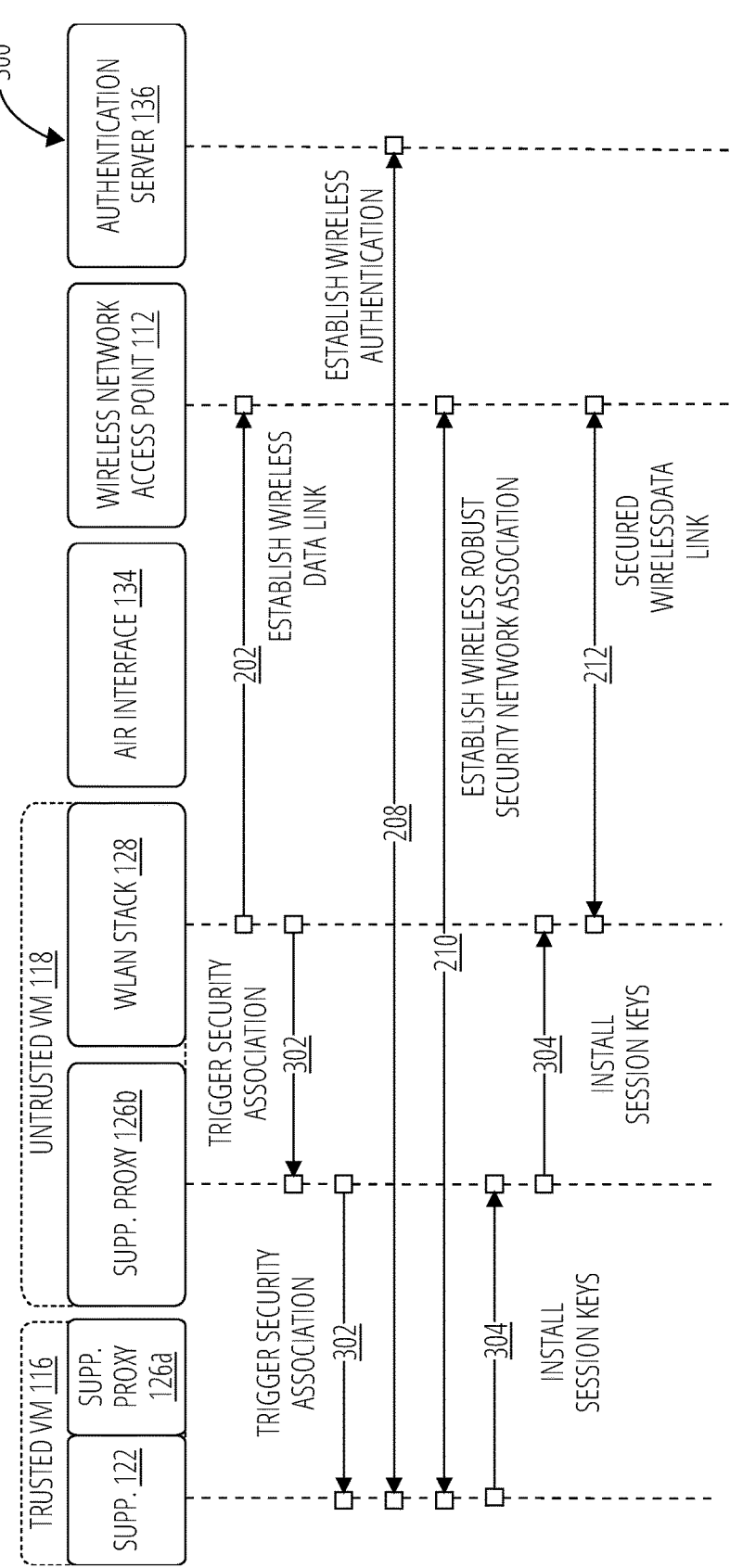
FIG. 3 illustrates another method of authenticating a wireless network connection, in accordance with at least one embodiment of the present disclosure.

FIG. 3 illustrates a method 300, in accordance with non-limiting example(s) of the present disclosure. In general, method 200 depicts operations of trusted virtual machine 116, untrusted virtual machine 118, wireless network access point 112, and authentication server 136 for untrusted virtual machine 118 to establish a wireless connection with wireless network access point 112 via wireless network device 110 and to control wireless network device 110. As depicted, NW credentials 120 are not exposed to untrusted virtual machine 118 during method 300, yet untrusted virtual machine 118 is able to establish a secured wireless data link and control wireless network device 110 despite lacking access to NW credentials 120.

Method 300 can begin at operation 202 "establish a wireless network data link" where a wireless network data link can be established. For example, processor 104 can execute WLAN stack 128 to establish a wireless network data link between wireless network device 110 and wireless network access point 112 over air interface 134. That is, untrusted virtual machine 118 can establish a wireless data link. In some examples, processor 104 can execute WLAN stack 128 to establish the wireless network data link via one or more wireless network protocols or standards, such as, for example, IEEE 802.11.

Continuing to operations 302 "trigger security association" a security association for the wireless data link can be triggered. For example, processor 104 can execute WLAN stack 128 and supplicant proxy 126b to establish security associations for the wireless data link established at operation 202. Likewise, processor 104 can execute supplicant 122, supplicant proxy 126a, supplicant proxy 126b to trigger security association for the data link. Said differently, processor 104 can execute WLAN stack 128 to generate connection specific messages (e.g., EAP frames, or the like), which are routed to supplicant 122 and ultimately to authentication server 136 via supplicant proxies 126b and 126a. It is noted that operation 302 is like 204 with the difference being that authentication frames (e.g., EAP frames, or the like) are generated locally at the untrusted virtual machine 118 (e.g., by WLAN stack 128) and then routed to the authentication server 136 via the trusted virtual machine 116 (e.g., through supplicant proxy 126a and/or supplicant 122), which stores NW credentials 120.

Method 300 includes operation 208 and 210 like method 200 discussed above. As such, session keys are generated and received at supplicant 122 of trusted virtual machine 116. Once supplicant 122 receives the session keys, method 300 can continue to operations 304. At operations operation 304 "install session keys" the session keys received at operation 210 or session keys derived from the session keys received at operation 210 can be installed in WLAN stack 128 by routing the session keys from supplicant 122 to supplicant proxy 126b (e.g., via supplicant proxy 126a, or the like). For example, processor 104 can execute supplicant 122 to cause supplicant 122 to install the session keys in WLAN stack 128 via supplicant proxy 126b.

Continuing to operation 212 "secured data link" processor 104 can execute WLAN stack 128 to secure the data link established between wireless network device 110 and wireless network access point 112 at operation 202, for example, with the installed session keys. That is, untrusted virtual machine 118 established a secure wireless connection between wireless network device 110 and wireless network access point 112 and can control wireless network device 110 to access wireless services supported by wireless network device 110. It is noted that with method 300, It is important to note that with method 300 the WLAN stack 128 routes only the authentication messages (e.g., EAP frames, or the like) to the supplicant proxy supplicant 122. As such, user data transmitted and/or received at WLAN stack 128 is not exposed to the supplicant proxy 126b and/or to any other VM (e.g., trusted virtual machine 116).

Further, it is to be appreciated that in some examples of the present disclosure, attestation of the untrusted virtual machine 118 by trusted virtual machine 116 to ensure the untrusted virtual machine 118 is not executing malicious code may be made. Likewise, untrusted virtual machine 118 can implement attestation of trusted virtual machine 116 to ensure that trusted virtual machine 116 is not exfiltrating credentials to another tenant or to external entities. A number of attestation techniques can be provided, such as, for example, use of trusted platform module (TPM), trusted execution technology (TXT), trusted computing group (TCG) device identify (DICE) layered attestation, or use of attestation techniques promulgated by the fast identify online (FIDO) Alliance or GlobalPlatform, etc. Accordingly in some embodiments, the each of trusted virtual machine 116 and untrusted virtual machine 118 can determine whether the other VM is trusted before engaging on the authentication methods described herein. Accordingly, the present disclosure provides an advantage in that NW credentials 120 is moved beyond the reach of malicious actors in the untrusted virtual machine 118.

FIG. 4 illustrates a method 400, in accordance with non-limiting example(s) of the present disclosure. method 400 can be implemented by a VM executing on a host device to a connect to and control a wireless network device without being exposed to the wireless network credentials. With some examples, method 400 can be implemented by untrusted virtual machine 118 executing on host device 102 of system 100.

method 400 can begin at block 402. At block 402 "generate, at a wireless network stack of a first virtual machine (VM) executing on a host device, an indication to authenticate a wireless data link established between the wireless network stack and a wireless access point via a wireless network device of the host device" and indication to authenticate a wireless data link can be generated. For example, WLAN stack 128 of untrusted virtual machine 118 executing on host device 102 can generate an indication to authenticate a wireless data link between wireless network device 110 and wireless network access point 112. In particular, processor 104 can execute WLAN stack 128 to cause WLAN stack 128 to generate an indication to authenticate a wireless network connection between wireless network device 110 and wireless network access point 112, such as, for example, EAP frames, or the like. In some examples, processor 104 can execute WLAN stack 128 to establish the wireless network connection prior to generating the indication of authentication.

Continuing to block 404 "send the indication to authenticate the wireless data link to a supplicant of a second VM executing on the host device" the indication to authenticate the wireless data link is routed to a supplicant of another VM executing on the host device. For example, WLAN stack 128 can route the indication to authenticate the wireless datalink to the supplicant 122 of trusted virtual machine 116 executing on host device 102 of system 100, where trusted virtual machine 116 has access to NW credentials 120. In particular, processor 104 can execute WLAN stack 128 to cause WLAN stack 128 to route the indication to authenticate the wireless data connection to supplicant 122 through supplicant proxy 126*a* and supplicant proxy 126*b*.

Continuing to block 406 "receive from the supplicant one or more session keys" where one or more session keys are received from the supplicant. In particular, WLAN stack 128 of untrusted virtual machine 118 can receive one or more session keys from supplicant 122 of trusted virtual machine 116. In particular, processor 104 can execute WLAN stack 128 to cause WLAN stack 128 to receive one or more session keys from supplicant 122 via supplicant proxy 126*a* and supplicant proxy 126*b*.

Continuing to block 408 "secure the wireless data link based on the one or more session keys" the wireless data link can be secured using the one or more session keys. For example, WLAN stack 128 can secure the wireless data link with which the indication to authenticate was generated at block 402. In particular, processor 104 can execute WLAN stack 128 to cause WLAN stack 128 to secure the wireless network connection (wireless data link) between wireless network device 110 and wireless network access point 112.

FIG. 5 illustrates a method 500 in accordance with non-limiting example(s) of the present disclosure. method 500 can be implemented by a VM executing on a host device to authenticate a wireless network connection established by another VM executing on the host device without exposing the wireless network credentials to the requesting VM. With some examples, method 400 can be implemented by untrusted virtual machine 118 executing on host device 102 of system 100.

Method 500 can begin at block 502. At block 502 "receive, at a supplicant of a first virtual machine (VM) executing on a host device, an indication to authenticate a wireless data link established between a wireless network stack of a second VM and a wireless access point via a wireless network device of the host device, the second VM executing on the host device" an indication to authenticate a wireless data link can be received. For example, supplicant 122 of trusted virtual machine 116 executing on host device 102 can receive an indication to authenticate a wireless network connection established by untrusted virtual machine 118 between wireless network device 110 and wireless network access point 112. In particular, processor 104 can execute supplicant 122 to cause supplicant 122 to receive an indication to authenticate a wireless network connection (e.g., EAP frames, or the like) between wireless network device 110 and wireless network access point 112 established by WLAN stack 128 of untrusted virtual machine 118. In some examples supplicant 122 can receive the indication from WLAN stack 128 via supplicant proxy 126*a* and supplicant proxy 126*b*.

Continuing to block 504 "establish wireless authentication of the wireless data link with an authentication server based on the indication to authenticate" the wireless network connection is authenticated based on the indication to authenticate. For example, supplicant 122 of trusted virtual machine 116 can authenticate the wireless network connection established by WLAN stack 128 of untrusted virtual machine 118 based on the indication received at block 502. In particular, processor 104 can execute supplicant 122 to cause supplicant 122 to authenticate the wireless network connection.

Continuing to block 506 "receive, at the supplicant, one or more session keys associated with the wireless authentication" a number of session keys can be received at the supplicant. For example, supplicant 122 can receive one or more session keys based on authenticating the wireless network connection with an authentication server. In particular, processor 104 can execute supplicant 122 to cause supplicant 122 to receive session keys from authentication server 136 based on authenticating the wireless network connection with the indication received at block 502.

Continuing to block 508 "install the one or more session keys in the wireless network stack" the one or more session keys can be installed in the wireless network stack. For example, supplicant 122 can install the session keys in WLAN stack 128. In particular, processor 104 can execute supplicant 122 to cause supplicant 122 to install the session keys into WLAN stack 128 via supplicant proxy 126*a* and supplicant proxy 126*b*.

Figure 6:
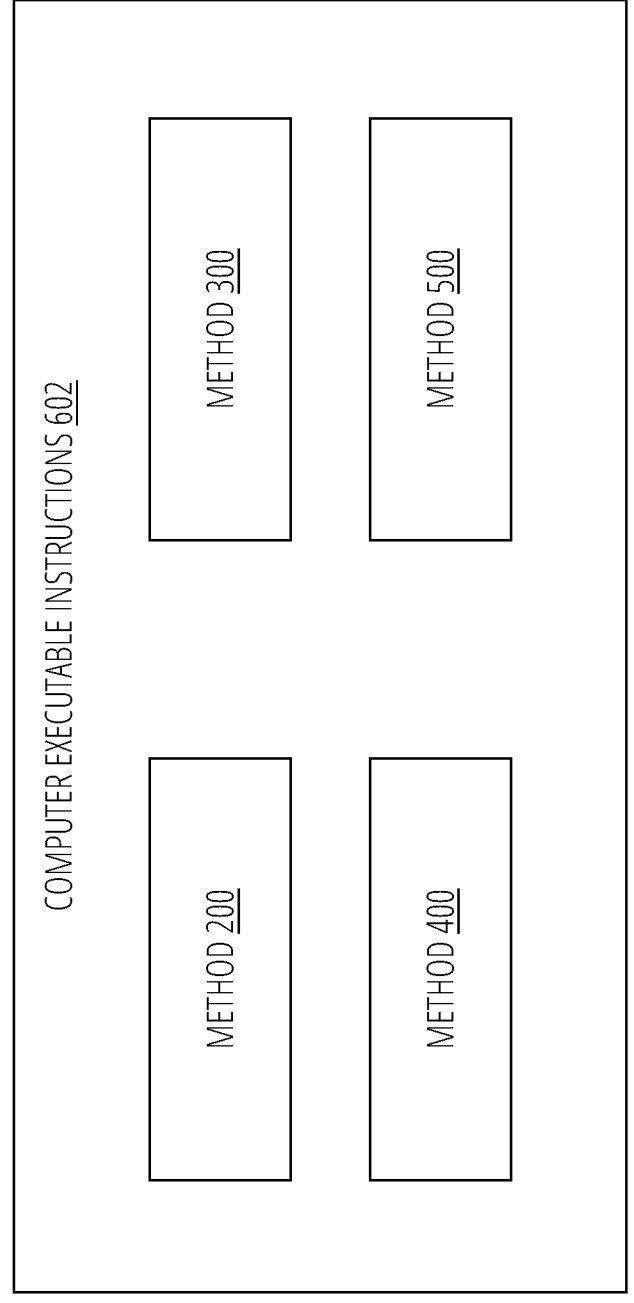
FIG. 6 illustrates a computer-readable storage medium, in accordance with at least one embodiment of the present disclosure.

FIG. 6 illustrates computer-readable storage medium 600. Computer-readable storage medium 600 may comprise any non-transitory computer-readable storage medium or machine-readable storage medium, such as an optical, magnetic or semiconductor storage medium. In various embodiments, computer-readable storage medium 600 may comprise an article of manufacture. In some embodiments, computer-readable storage medium 600 may store computer executable instructions 602 with which circuitry (e.g., processor 104, or the like) can execute. For example, computer executable instructions 602 can include instructions to implement operations described with respect to method 200, method 300, method 400 and/or method 500. Examples of computer-readable storage medium 600 or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions 602 may include any suitable type of code, such as source code, compiled code, interpreted code, executable code, static code, dynamic code, object-oriented code, visual code, and the like.

Figure 7:
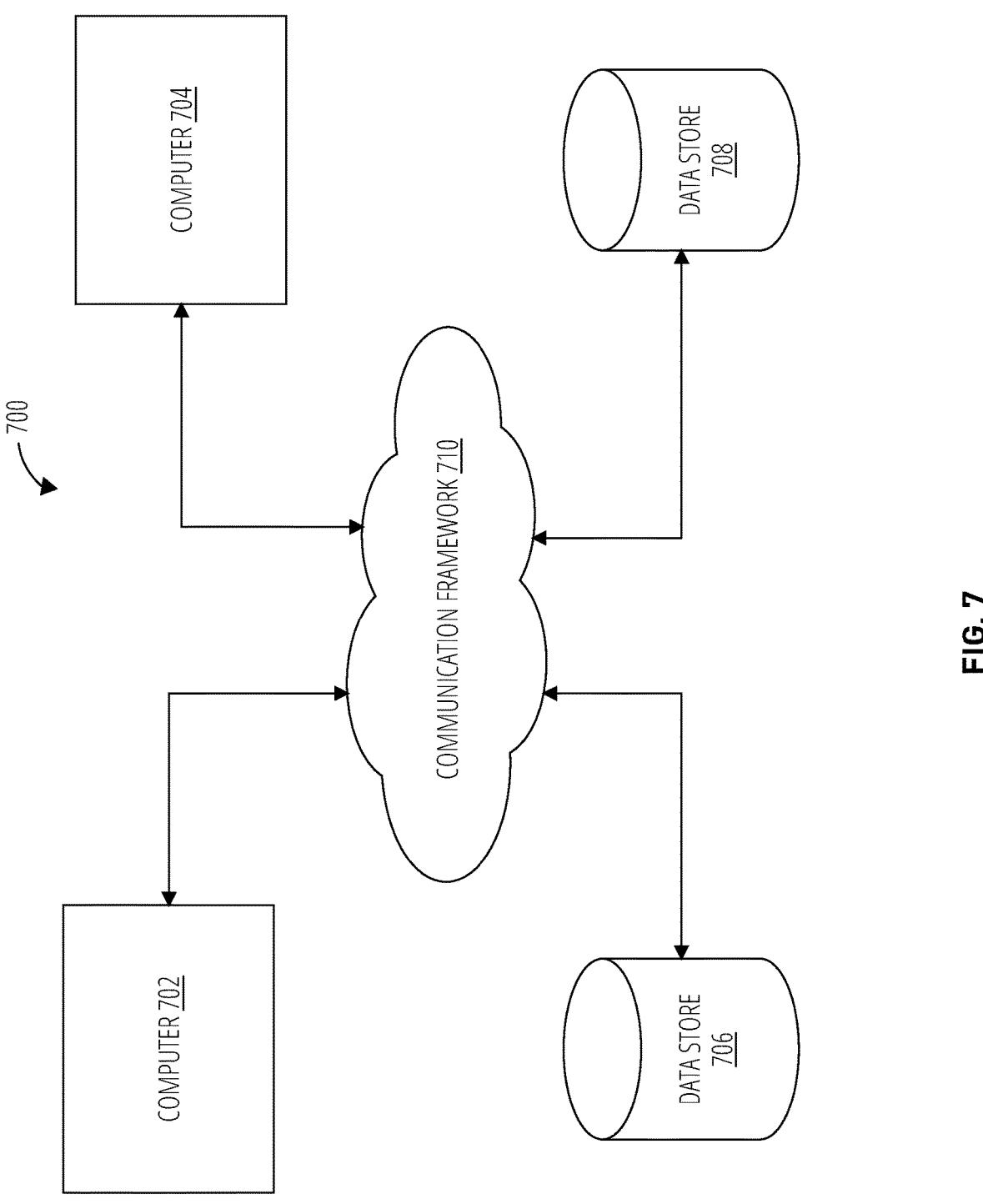
FIG. 7 illustrates a communication architecture, in accordance with at least one embodiment of the present disclosure.

FIG. 7 illustrates an exemplary communications communication architecture 700 suitable for implementing various embodiments. For example, one or more computing devices may communicate with each other via a communication framework 710, which may be a network implemented to facilitate electronic communication between devices. The communication architecture 700 includes various common communications elements, such as a transmitter, receiver, transceiver, radio, network interface, baseband processor, antenna, amplifiers, filters, power supplies, and so forth. System 100, and particularly host device 102 can communicate in a fashion like communication architecture 700. For example, trusted virtual machine 116 and/or untrusted virtual machine 118 can communicate using communication architecture 700. The present disclosure can be provided for trusted virtual machine 116 to authenticate a wireless network connection established and controlled by untrusted virtual machine 118 without exposing untrusted virtual machine 118 to NW credentials 120.

As shown in this figure, the communication architecture 700 includes a computer 702 and a computer 704, which are operatively connected to one or more respective data stores, such as, data store 706 and/or data store 708. Data store 706 and data store 708 can be employed to store information local to the respective computers (e.g., computer 702, computer 704, etc.), such as cookies and/or associated contextual information.

Computer 702 and computer 704 may communicate information between each other using a communication framework 710. Computer 702 and computer 704 may provide time synchronization as part of communicating information between each other using communication framework 710. In one example, computer 702 may be implemented or configured in an RSU, and further, computer 704 may be implemented or configured in a vehicle. The communication framework 710 may implement any well-known communications techniques and protocols. The communication framework 710 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communication framework 710 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/500 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by computer 702 and computer 704. Communication framework 710 may be any one or combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 8:
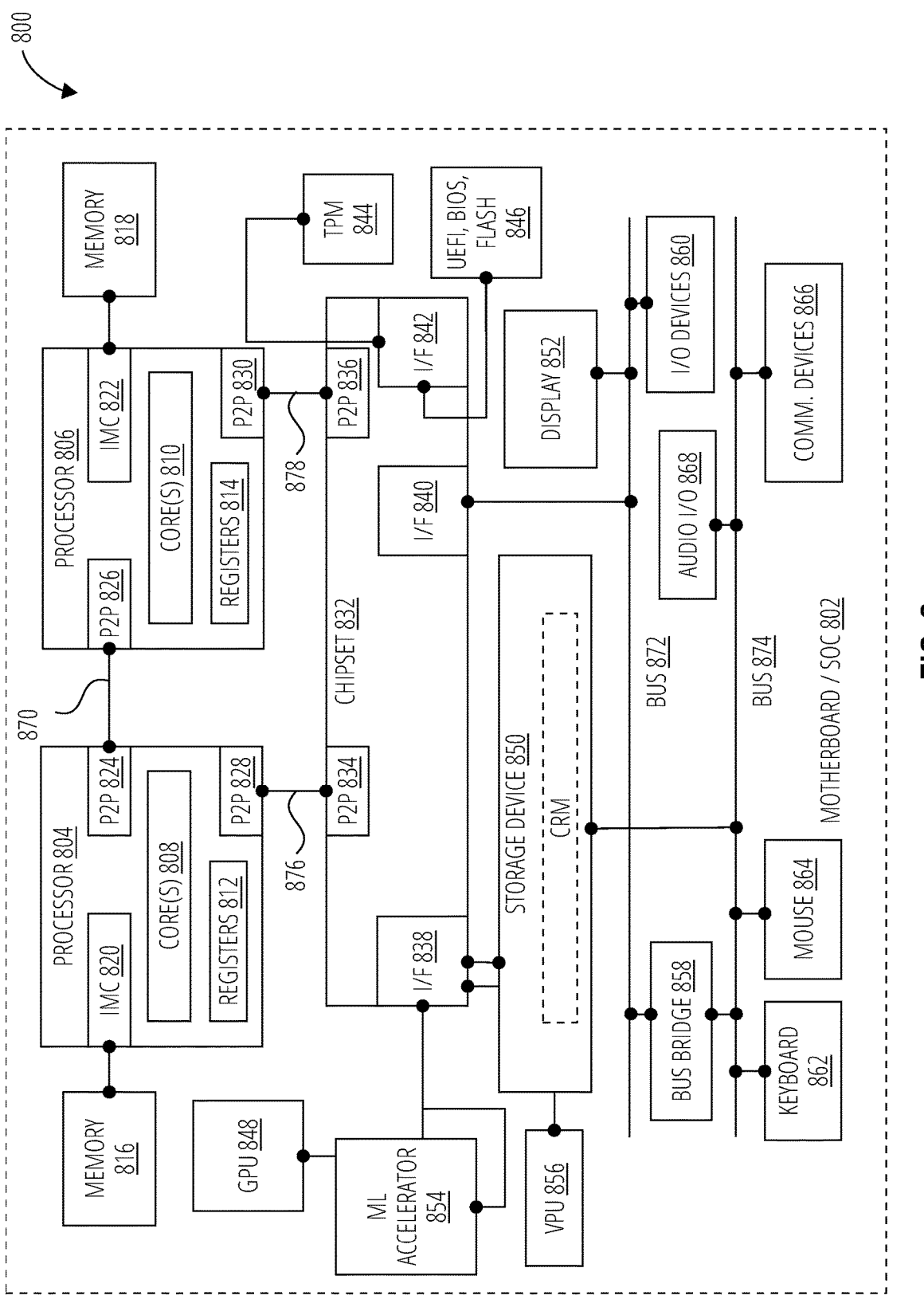
FIG. 8 illustrates a computing system, in accordance with at least one embodiment of the present disclosure.

FIG. 8 illustrates an embodiment of a system 800. System 800 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 800 may have a single processor with one core or more than one processor. Note that the term "processor" refers to a processor with a single core or a processor package with multiple processor cores. In at least one embodiment, the computing system 800 is representative of the components of host device 102 of the system 100. More generally, the computing system 800 is configured to implement all logic, systems, logic flows, methods, apparatuses, and functionality described herein with reference to FIG. 1 to FIG. 7.

As used in this application, the terms "system" and "component" and "module" are intended to refer to a computer-related entity, either hardware, a combination of hardware and software, software, or software in execution, examples of which are provided by the exemplary system 800. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 800 comprises a motherboard or system-on-chip (SoC) 802 for mounting platform components. Motherboard or system-on-chip (SoC) 802 is a point-to-point (P2P) interconnect platform that includes a first processor 804 and a second processor 806 coupled via a point-to-point interconnect 870 such as an Ultra Path Interconnect (UPI). In other embodiments, the system 800 may be of another bus architecture, such as a multi-drop bus. Furthermore, each of processor 804 and processor 806 may be processor packages with multiple processor cores including core(s) 808 and core(s) 810, respectively. While the system 800 is an example of a two-socket (2S) platform, other embodiments may include more than two sockets or one socket. For example, some embodiments may include a four-socket (4S) platform or an eight-socket (8S) platform.

Each socket is a mount for a processor and may have a socket identifier. Note that the term platform refers to the motherboard with certain components mounted such as the processor 804 and chipset 832. Some platforms may include additional components and some platforms may only include sockets to mount the processors and/or the chipset. Furthermore, some platforms may not have sockets (e.g., SoC, or the like).

The processor 804 and processor 806 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola® DragonBall® and PowerPC® processors; IBM and Sony® Cell processors; and similar processors. Dual microprocessors, multi-core processors, and other multi-processor architectures may also be employed as the processor 804 and/or processor 806. Additionally, the processor 804 need not be identical to processor 806.

Processor 804 includes registers 812, integrated memory controller (IMC) 820, and point-to-point (P2P) interface 824 and P2P interface 828. Similarly, the processor 806 includes registers 814, IMC 822, as well as P2P interface 826 and P2P interface 830. IMC 820 and IMC 822 couple the processors processor 804 and processor 806, respectively, to respective memories (e.g., memory 816 and memory 818). Memory 816 and memory 818 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 816 and memory 818 locally attach to the respective processors (i.e., processor 804 and processor 806). In other embodiments, the main memory may couple with the processors via a bus and shared memory hub.

System 800 includes chipset 832 coupled to processor 804 and processor 806. Furthermore, chipset 832 can be coupled to storage device 850, for example, via an interface (I/F) 838. The I/F 838 may be, for example, a Peripheral Component Interconnect-enhanced (PCI-e). Storage device 850 can store instructions executable by circuitry of system 800 (e.g., processor 804, processor 806, GPU 848, ML accelerator 854, vision processing unit 856, or the like). For example, storage device 850 can store instructions for computer-readable storage medium 600, or the like.

Processor 804 couples to a chipset 832 via P2P interface 828 and P2P 834 while processor 806 couples to a chipset 832 via P2P interface 830 and P2P 836. Direct media interface (DMI) 876 and DMI 878 may couple the P2P interface 828 and the P2P 834 and the P2P interface 830 and P2P 836, respectively. DMI 876 and DMI 878 may be a high-speed interconnect that facilitates, e.g., eight Giga Transfers per second (GT/s) such as DMI 3.0. In other embodiments, the processor 804 and processor 806 may interconnect via a bus.

The chipset 832 may comprise a controller hub such as a platform controller hub (PCH). The chipset 832 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 832 may comprise more than one controller hub such as a chipset with a memory controller hub, a graphics controller hub, and an input/output (I/O) controller hub.

In the depicted example, chipset 832 couples with a trusted platform module (TPM) 844 and UEFI, BIOS, FLASH circuitry 846 via I/F 842. The TPM 844 is a dedicated microcontroller designed to secure hardware by integrating cryptographic keys into devices. The UEFI, BIOS, FLASH circuitry 846 may provide pre-boot code.

Furthermore, chipset 832 includes the I/F 838 to couple chipset 832 with a high-performance graphics engine, such as, graphics processing circuitry or a graphics processing unit (GPU) 848. In other embodiments, the system 800 may include a flexible display interface (FDI) (not shown) between the processor 804 and/or the processor 806 and the chipset 832. The FDI interconnects a graphics processor core in one or more of processor 804 and/or processor 806 with the chipset 832.

Additionally, ML accelerator 854 and/or vision processing unit 856 can be coupled to chipset 832 via I/F 838. ML accelerator 854 can be circuitry arranged to execute ML related operations (e.g., training, inference, etc.) for ML models. Likewise, vision processing unit 856 can be circuitry arranged to execute vision processing specific or related operations. In particular, ML accelerator 854 and/or vision processing unit 856 can be arranged to execute mathematical operations and/or operands useful for machine learning, neural network processing, artificial intelligence, vision processing, etc.

Various I/O devices 860 and display 852 couple to the bus 872, along with a bus bridge 858 which couples the bus 872 to a second bus 874 and an I/F 840 that connects the bus 872 with the chipset 832. In one embodiment, the second bus 874 may be a low pin count (LPC) bus. Various devices may couple to the second bus 874 including, for example, a keyboard 862, a mouse 864 and communication devices 866.

Furthermore, an audio I/O 868 may couple to second bus 874. Many of the I/O devices 860 and communication devices 866 may reside on the motherboard or system-on-chip (SoC) 802 while the keyboard 862 and the mouse 864 may be add-on peripherals. In other embodiments, some or all the I/O devices 860 and communication devices 866 are add-on peripherals and do not reside on the motherboard or system-on-chip (SoC) 802.

The following examples pertain to further embodiments, from which numerous permutations and configurations will be apparent.

Example 1. A method, comprising: generating, at a wireless network stack of a first virtual machine (VM) executing on a host device, an indication to authenticate a wireless data link established between the wireless network stack and a wireless access point via a wireless network device of the host device; sending the indication to authenticate the wireless data link to a supplicant of a second VM executing on the host device; receiving from the supplicant one or more session keys; and securing the wireless data link based on the one or more session keys.

Example 2. The method of example 1, comprising establishing the wireless data link.

Example 3. The method of example 1, comprising sending the indication to authenticate the wireless data link to the supplicant via a supplicant proxy of the first VM.

Example 4. The method of example 3, comprising sending the indication to authenticate the wireless data link to the supplicant via the supplicant proxy of the first VM and a supplicant proxy of the second VM.

Example 5. The method of example 1, wherein the indication to authenticate the wireless data link comprising an extensible authentication protocol (EAP) frame.

Example 6. The method of example 5, wherein the wireless data link is established based on the Institute of Electrical and Electronics Engineers (IEEE) 802.11 standard and wherein the EAP frame is generated based on the IEEE 802.1X standard.

Example 7. A method, comprising: receiving, at a supplicant of a first virtual machine (VM) executing on a host device, an indication to authenticate a wireless data link established between a wireless network stack of a second VM and a wireless access point via a wireless network device of the host device, the second VM executing on the host device; establishing wireless authentication of the wireless data link with an authentication server based on the indication to authenticate; receiving, at the supplicant, one or more session keys associated with the wireless authentication; and installing the one or more session keys in the wireless network stack.

Example 8. The method of example 7, receiving, at the supplicant of the first VM, an indication to authenticate the wireless data link comprising receiving the indication to authenticate the wireless data link from a supplicant proxy at the second VM, wherein the indication to authenticate the wireless link is generated at the wireless network stack.

Example 9. The method of example 8, receiving, at the supplicant of the first VM, an indication to authenticate the wireless data link comprising receiving the indication to authenticate the wireless data link at a supplicant proxy of the first VM.

Example 10. The method of example 7, installing the one or more session keys in the wireless network stack comprising sending the one or more session keys to a supplicant proxy of the second VM, wherein the supplicant proxy installs the one or more session keys into the wireless network stack.

Example 11. The method of example 7, wherein the indication to authenticate the wireless data link comprising an extensible authentication protocol (EAP) frame.

Example 12. The method of example 11, wherein the wireless data link is established based on the Institute of Electrical and Electronics Engineers (IEEE) 802.11 standard and wherein the EAP frame is generated based on the IEEE 802.1X standard.

Example 13. A computing apparatus comprising: a wireless network device; a processor; and a memory storing instructions that, when executed by the processor, configure a first virtual machine (VM) executed by the processor to: generate, at a wireless network stack of a first virtual machine (VM) executed by the processor, an indication to authenticate a wireless data link established between the wireless network stack and a wireless access point via the wireless network device; send the indication to authenticate the wireless data link to a supplicant of a second VM execute by the processor; receive from the supplicant one or more session keys; and secure the wireless data link based on the one or more session keys.

Example 14. The computing apparatus of example 13, the instructions when executed by the processor cause the first VM to establish the wireless data link.

Example 15. The computing apparatus of example 13, the instructions when executed by the processor cause the first VM to send the indication to authenticate the wireless data link to the supplicant via a supplicant proxy of the first VM.

Example 16. The computing apparatus of example 15, the instructions when executed by the processor cause the first VM to send the indication to authenticate the wireless data link to the supplicant via the supplicant proxy of the first VM and a supplicant proxy of the second VM.

Example 17. The computing apparatus of example 13, wherein the indication to authenticate the wireless data link comprising an extensible authentication protocol (EAP) frame.

Example 18. The computing apparatus of example 17, wherein the wireless data link is established based on the Institute of Electrical and Electronics Engineers (IEEE) 802.11 standard and wherein the EAP frame is generated based on the IEEE 802.1X standard.

Example 19. A non-transitory computer-readable storage medium, the computer-readable storage medium including instructions that when executed by processing circuitry of a host computing device, cause the host computing device to: receive, at a supplicant of a first virtual machine (VM) executing on the host computing device, an indication to authenticate a wireless data link established between a wireless network stack of a second VM and a wireless access point via a wireless network device of the host computing device, the second VM executing on the host computing device; establish wireless authentication of the wireless data link with an authentication server based on the indication to authenticate; receive, at the supplicant, one or more session keys associated with the wireless authentication; and install the one or more session keys in the wireless network stack.

Example 20. The non-transitory computer-readable storage medium of example 19, the instructions when executed by the processing circuitry cause the host computing device to receive the indication to authenticate the wireless data link from a supplicant proxy at the second VM, wherein the indication to authenticate the wireless link is generated at the wireless network stack.

Example 21. The non-transitory computer-readable storage medium of example 20, the instructions when executed by the processing circuitry cause the host computing device to receive the indication to authenticate the wireless data link at a supplicant proxy of the first VM.

Example 22. The non-transitory computer-readable storage medium of example 19, the instructions when executed by the processing circuitry cause the host computing device to send the one or more session keys to a supplicant proxy of the second VM, wherein the supplicant proxy installs the one or more session keys into the wireless network stack.

Example 23. The non-transitory computer-readable storage medium of example 19, wherein the indication to authenticate the wireless data link comprising an extensible authentication protocol (EAP) frame.

Example 24. The non-transitory computer-readable storage medium of example 23, wherein the wireless data link is established based on the Institute of Electrical and Electronics Engineers (IEEE) 802.11 standard and wherein the EAP frame is generated based on the IEEE 802.1X standard.

Example 25. An apparatus, comprising: means for generating, at a wireless network stack of a first virtual machine (VM) executing on a host device, an indication to authenticate a wireless data link established between the wireless network stack and a wireless access point via a wireless network device of the host device; means for sending the indication to authenticate the wireless data link to a supplicant of a second VM executing on the host device; means for receiving from the supplicant one or more session keys; and means for securing the wireless data link based on the one or more session keys.

Example 26. The apparatus of example 25, comprising means for establishing the wireless data link.

Example 27. The apparatus of example 25, comprising means for sending the indication to authenticate the wireless data link to the supplicant via a supplicant proxy of the first VM.

Example 28. The apparatus of example 27, comprising means for sending the indication to authenticate the wireless data link to the supplicant via the supplicant proxy of the first VM and a supplicant proxy of the second VM.

Example 29. The apparatus of example 25, wherein the indication to authenticate the wireless data link comprising an extensible authentication protocol (EAP) frame.

Example 30. The apparatus of example 29, wherein the wireless data link is established based on the Institute of Electrical and Electronics Engineers (IEEE) 802.11 standard and wherein the EAP frame is generated based on the IEEE 802.1X standard.

Example 31. An apparatus, comprising: means for receiving, at a supplicant of a first virtual machine (VM) executing on a host device, an indication to authenticate a wireless data link established between a wireless network stack of a second VM and a wireless access point via a wireless network device of the host device, the second VM executing on the host device; means for establishing wireless authentication of the wireless data link with an authentication server based on the indication to authenticate; means for receiving, at the supplicant, one or more session keys associated with the wireless authentication; and means for installing the one or more session keys in the wireless network stack.

Example 32. The apparatus of example 31, comprising means for receiving the indication to authenticate the wireless data link from a supplicant proxy at the second VM, wherein the indication to authenticate the wireless link is generated at the wireless network stack.

Example 33. The apparatus of example 32, comprising means for receiving the indication to authenticate the wireless data link at a supplicant proxy of the first VM.

Example 34. The apparatus of example 31, comprising means for sending the one or more session keys to a supplicant proxy of the second VM, wherein the supplicant proxy installs the one or more session keys into the wireless network stack.

Example 35. The apparatus of example 31, wherein the indication to authenticate the wireless data link comprising an extensible authentication protocol (EAP) frame.

Example 36. The apparatus of example 35, wherein the wireless data link is established based on the Institute of Electrical and Electronics Engineers (IEEE) 802.11 standard and wherein the EAP frame is generated based on the IEEE 802.1X standard.

Example 37. A non-transitory computer-readable storage medium, the computer-readable storage medium including instructions that when executed by processing circuitry of a host computing device, cause the processing circuitry to: generate, at a wireless network stack of a first virtual machine (VM) executed by the processor, an indication to authenticate a wireless data link established between the wireless network stack and a wireless access point via the wireless network device; send the indication to authenticate the wireless data link to a supplicant of a second VM execute by the processor; receive from the supplicant one or more session keys; and secure the wireless data link based on the one or more session keys.

Example 38. The non-transitory computer-readable storage medium of example 37, the instructions when executed by the processing circuitry cause the first VM to establish the wireless data link.

Example 39. The non-transitory computer-readable storage medium of example 37, the instructions when executed by the processing circuitry cause the first VM to send the indication to authenticate the wireless data link to the supplicant via a supplicant proxy of the first VM.

Example 40. The non-transitory computer-readable storage medium of example 39, the instructions when executed by the processing circuitry cause the first VM to send the indication to authenticate the wireless data link to the supplicant via the supplicant proxy of the first VM and a supplicant proxy of the second VM.

Example 41. The non-transitory computer-readable storage medium of example 37, wherein the indication to authenticate the wireless data link comprising an extensible authentication protocol (EAP) frame.

Example 42. The non-transitory computer-readable storage medium of example 37, wherein the wireless data link is established based on the Institute of Electrical and Electronics Engineers (IEEE) 802.11 standard and wherein the EAP frame is generated based on the IEEE 802.1X standard.

Example 43. A computing apparatus of a host computing device, comprising: a wireless network device; a processor; and a memory storing instructions that, when executed by the processor, configure the host computing device to: receive, at a supplicant of a first virtual machine (VM) executing on the host computing device, an indication to authenticate a wireless data link established between a wireless network stack of a second VM and a wireless access point via a wireless network device of the host computing device, the second VM executing on the host computing device; establish wireless authentication of the wireless data link with an authentication server based on the indication to authenticate; receive, at the supplicant, one or more session keys associated with the wireless authentication; and install the one or more session keys in the wireless network stack.

Example 44. The computing apparatus of example 43, the instructions when executed by the processor cause the host computing device to receive the indication to authenticate the wireless data link from a supplicant proxy at the second VM, wherein the indication to authenticate the wireless link is generated at the wireless network stack.

Example 45. The computing apparatus of example 44, the instructions when executed by the processor cause the host computing device to receive the indication to authenticate the wireless data link at a supplicant proxy of the first VM.

Example 46. The computing apparatus of example 43, the instructions when executed by the processor cause the host computing device to send the one or more session keys to a supplicant proxy of the second VM, wherein the supplicant proxy installs the one or more session keys into the wireless network stack.

Example 47. The computing apparatus of example 43, wherein the indication to authenticate the wireless data link comprising an extensible authentication protocol (EAP) frame.

Example 48. The computing apparatus of example 47, wherein the wireless data link is established based on the Institute of Electrical and Electronics Engineers (IEEE) 802.11 standard and wherein the EAP frame is generated based on the IEEE 802.1X standard.

What is claimed is:
1. A method, comprising:
   generating, at a wireless network stack of an untrusted virtual machine (VM) executing on a host device, an indication to authenticate a wireless data link estab- lished between the wireless network stack and a wireless access point via a wireless network device of the host device;

sending the indication to authenticate the wireless data link to a supplicant of a trusted VM executing on the host device via a supplicant proxy of the untrusted VM, the supplicant proxy to route authentication protocol messages from the wireless network stack to the supplicant;

receiving from the supplicant one or more session keys via the supplicant proxy of the untrusted VM; and securing the wireless data link based on the one or more session keys.

2. The method of claim 1, comprising establishing the wireless data link.

3. The method of claim 1, comprising sending the indication to authenticate the wireless data link to the supplicant via the supplicant proxy of the untrusted VM and a supplicant proxy of the trusted VM.

4. The method of claim 1, wherein the indication to authenticate the wireless data link comprising an extensible authentication protocol (EAP) frame.

5. The method of claim 4, wherein the wireless data link is established based on the Institute of Electrical and Electronics Engineers (IEEE) 802.11 standard and wherein the EAP frame is generated based on the IEEE 802.1X standard.

6. A computing apparatus comprising:

a wireless network device;

a processor; and a memory storing instructions that, when executed by the processor, configure an untrusted virtual machine (VM) executed by the processor to:

generate, at a wireless network stack of the untrusted VM executed by the processor, an indication to authenticate a wireless data link established between the wireless network stack and a wireless access point via the wireless network device;

send the indication to authenticate the wireless data link to a supplicant of a trusted VM execute by the processor via a supplicant proxy of the untrusted VM, the supplicant proxy to route authentication protocol messages from the wireless network stack to the supplicant;

receive from the supplicant one or more session keys via the supplicant proxy of the untrusted VM; and secure the wireless data link based on the one or more session keys.

7. The computing apparatus of claim 6, the instructions when executed by the processor cause the untrusted VM to establish the wireless data link.

8. The computing apparatus of claim 6, the instructions when executed by the processor cause the untrusted VM to send the indication to authenticate the wireless data link to the supplicant via the supplicant proxy of the untrusted VM and a supplicant proxy of the trusted VM.

9. The computing apparatus of claim 6, wherein the indication to authenticate the wireless data link comprising an extensible authentication protocol (EAP) frame.

10. The computing apparatus of claim 9, wherein the wireless data link is established based on the Institute of Electrical and Electronics Engineers (IEEE) 802.11 standard and wherein the EAP frame is generated based on the IEEE 802.1X standard.

11. A non-transitory computer-readable storage medium, the computer-readable storage medium including instructions that when executed by processing circuitry of a host computing device, cause the host computing device to:

generate, at a wireless network stack of an untrusted virtual machine (VM) executing on a host device, an indication to authenticate a wireless data link established between the wireless network stack and a wireless access point via a wireless network device of the host device;

send the indication to authenticate the wireless data link to a supplicant of a trusted VM executing on the host device via a supplicant proxy of the untrusted VM, the supplicant proxy to route authentication protocol messages from the wireless network stack to the supplicant;

receive from the supplicant one or more session keys via the supplicant proxy of the untrusted VM; and secure the wireless data link based on the one or more session keys.

12. The computer-readable storage medium of claim 11, the instructions when executed by the processing circuitry cause the host computing device to establish the wireless data link.

13. The computer-readable storage medium of claim 11, the instructions when executed by the processing circuitry cause the host computing device to send the indication to authenticate the wireless data link to the supplicant via the supplicant proxy of the untrusted VM and a supplicant proxy of the trusted VM.

14. The computer-readable storage medium of claim 11, wherein the indication to authenticate the wireless data link comprising an extensible authentication protocol (EAP) frame.

15. The computer-readable storage medium of claim 14, wherein the wireless data link is established based on the Institute of Electrical and Electronics Engineers (IEEE) 802.11 standard and wherein the EAP frame is generated based on the IEEE 802.1X standard.

* * * * *